United States Patent [19]  [11] 4,069,487
Kasai et al.  [45] Jan. 17, 1978

[54] RECORDING MEMBER AND PROCESS FOR RECORDING

[75] Inventors: Masanao Kasai, Tokyo; Youko Oikawa, Kawasaki; Hiroshi Ito, Yokohama; Hiroshi Matsuno, Tokyo, all of Japan

[73] Assignee: Canon Kabushiki Kaisha, Tokyo, Japan

[21] Appl. No.: 643,171

[22] Filed: Dec. 22, 1975

[30] Foreign Application Priority Data

Dec. 26, 1974 Japan ............................. 50-2459
Jan. 29, 1975 Japan ............................. 50-12072
May 19, 1975 Japan ............................. 50-59370

[51] Int. Cl.² ......................................... G01G 15/34
[52] U.S. Cl. ................................. 346/76 L; 346/135
[58] Field of Search .................. 346/76 L, 135, 1; 340/173 LM

[56] References Cited

U.S. PATENT DOCUMENTS

| 3,314,073 | 4/1967 | Becker | 346/76 L |
| 3,636,526 | 1/1972 | Feinleib | 340/173 LM |
| 3,665,483 | 5/1972 | Becker et al. | 346/76 L X |
| 3,716,844 | 2/1973 | Brodsky | 346/135 X |
| 3,789,420 | 1/1974 | Claytor et al. | 346/76 L X |
| 3,902,010 | 8/1975 | Goshima | 346/108 X |
| 3,971,874 | 7/1976 | Ohta | 346/76 L X |
| 3,990,084 | 11/1976 | Hamisch | 346/135 |

Primary Examiner—Joseph W. Hartary
Attorney, Agent, or Firm—Fitzpatrick, Cella, Harper & Scinto

[57] ABSTRACT

A recording member for recording a laser beam bearing an information by deformation of a recording layer comprises a support, a recording layer of a non-metallic material and a protecting layer which is not destroyed by the laser beam.

4 Claims, 7 Drawing Figures

RECORDING MEMBER AND PROCESS FOR RECORDING

BACKGROUND OF THE INVENTION

1. Field of the Invention

This invention relates to a recording member used for recording by a laser beam and a process for recording comprising using said recording member.

2. Description of the Prior Art

There is known a process for recording an information by focussing a strongly modulated, scanned or deflected laser beam to a spot of a high energy density, irradiating a recording member and thereby selectively removing and/or deforming a part of the recording member by melting and/or vaporizing to produce a record of the information.

This type of recording process can give a real time recording without any post-treatment such as heat development and fixation, and any liquid treating agent, and can produce images of high resolution and high contrast. The recording medium is not sensitive to indoor light, so that no darkroom procedure is necessary, and is suitable for recording electric signals such as output of computers and transmitted time serial signals, and add-on is possible. Therefore, this type of recording process can be used for recording microimages and ultramicroimages, and for computer microfilmer, microfacsimile and phototypesetting plate, and can minify the recording apparatus, elevate the function and improve the image quality.

Conventional recording members used for this type of recording process are those composed of a support and an absorption layer of about 0.1 micron overlying the support and composed of a metal or a semi-metal such as rhodium, bismuth and the like. However, the degree of light reflection of such metal thin film is higher than 50% at the visible region, near infrared region and infrared region. Hence, only less than 50% of the light energy of a laser applied thereto is absorbed to the metal thin layer and such low rate of absorption is not desirable from an efficiency or sensitivity point of view. In addition, when an absorption layer made of a metal having a high thermal conductivity is irradiated with a laser beam, the temperature at the circumference of the irradiated portion becomes high and some deformations occur there due to melting and the like. In general, the recording density or resolution should have the highest value only at the focussed spot and therefore, the deformation at the circumference results in lowering of the recording density and resolution. As is clear from above, when a metal layer is used as a recording layer, the sensitivity and resolution are decreased.

Another drawback of the conventional recording member is as shown below. Since a working distance (a distance between a lens surface and a focus) of an optical system necessary for focussing a laser beam to a beam diameter of less than several microns is usually as short as several hundred microns, the vapor or particles of the recording layer material generated from the recording material when irradiated with a laser sometimes attach to the lens surface resulting in lowering the recording accuracy. Generally the depth of focus is less than several microns and therefore, it is necessary to detect the focussing state, feed the detected result back and maintain a constant focussing state at real time for the purpose of focussing the laser light effectively on the surface of the recording material. The vapor or sputtered particles of the recording layer material sometimes disturb the accuracy of the detection. Further, depending upon the type of the recording material and the irradiating conditions of laser, the vapor or sputtered particles cause a noise which effects a recording information.

SUMMARY OF THE INVENTION

It is an object of this invention to provide a recording member for a laser beam recording which is free from undesirable effects caused by vapors or sputtered particles of the recording layer material upon irradiating with a laser beam.

It is another object of this invention to provide a recording member for a laser beam recording having a high resolving power.

It is a further object of this invention to provide a mechanically strong recording member.

It is still another object of this invention to provide a process for recording a laser beam information using the above mentioned recording member.

According to the present invention, a recording member for recording by applying a laser beam to deform a recording layer by melting and/or vaporization comprises a support, a recording layer composed of a non-metallic material overlying the support, and a protecting layer overlying the recording layer, the protecting layer being not substantially destroyed by applying the laser beam for recording.

According to another aspect of the present invention, there is provided a process for recording a laser beam information by using the above mentioned recording member.

DESCRIPTION OF THE PREFERRED EMBODIMENT

Figure 1:
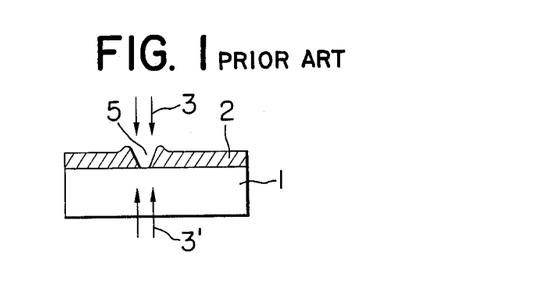
FIG. 1 is a cross section of one form of producing a record by irradiating a conventional recording member with a laser beam.

Referring to FIG. 1, the conventional recording member is composed of a support 1 and a recording layer 2. A laser beam 3 is applied to the recording member in accordance with the information to be recorded and the irradiated portion 5 of recording layer 2 is deformed by vaporization and/or melting to produce a record. When the support 1 is transparent to the laser beam used, the laser beam may be applied from the support side as shown by the reference numeral 3'. As described in the description of the prior art above, such conventional recording member has a drawback that vapors or sputtered particles of the recording layer material attach to a lens surface to disturb recording, and disturb the detection of the focussing state of the laser light, and further cause noise. In addition, when there is damage or attached dust on the surface of the recording member, it is difficult to distinguish essentially the damage and dust from the recorded portion though such distinguishing is possible in case of silver salt recording materials or vesicular films. Furthermore, when dusts attach to an information recorded portion, i.e. a portion of a recording layer forming material at which an image is produced, the similar result is obtained, and in particular the read-out of the recorded information becomes unclear. For example, when the thickness of recording layer 2 is about one micron and is damaged hurt, the damage easily reaches the surface of support 1 and this appears in the read-out so that the reliability of the recorded information is lost.

In particular, a recording layer of high sensitivity is usually formed in a very thin state so that it is weak and easily damaged.

Figure 2:
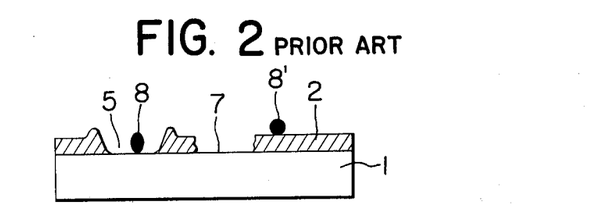
FIG. 2 is a cross section of a conventional recording member on which a record is formed as a result of irradiating a laser beam.

This can be explained by FIG. 2. A damaged portion 7 in a recording layer 2 is not substantially different from an information recorded portion 5 where a laser light was applied and therefore the damage 7 is also read-out as a part of the whole recorded information to cause confusion of information. In addition, dust 8' attached to the surface of recording layer 2 does not have so undesirable effect on the reading-out when the recorded information is read out as an intensity ratio of the transmitted visible lights because the optical density of recording layer 2 is usually as high as about 10 or more. However, dust 8 at the information recorded portion disturbs the information. Further, when such dust 8 and 8' is removed, the surface of recording layer 2 is often newly damaged.

Figure 3:
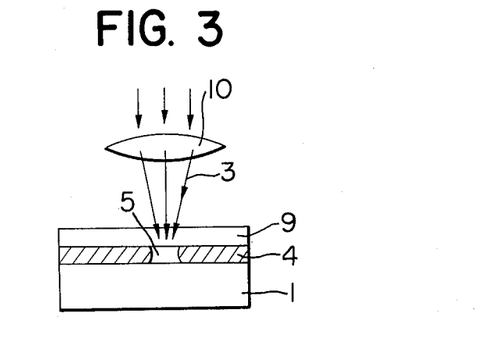
FIG. 3 is a cross section of a form of producing a record by applying a laser beam to a recording member of the present invention.

FIG. 3 illustrates a representative embodiment of the recording member according to the present invention. A recording layer 4 composed of a non-metallic material overlies a support 1 and a protecting layer 9 overlies the recording layer 4. A laser beam 3 is applied to recording layer 4 by using a lens system 10. The portion 5 irradiated with laser beam 3 in the recording layer 4 is deformed by vaporization or melting to form an information recorded portion. Vapors or scattered particles produced upon vaporization of the irradiated recording layer material are intercepted by protecting layer 9 and cannot come to outside of the recording member. Therefore, the scattered particles and vapors do not attach to the surface of the lens and the non-recorded portion of the recording member, and therefore, the recording accuracy is not lowered and the recording is not disadvantageously disturbed.

In the recording layer, the scattered particles and vapors attach to the surface of support 1 and the back surface of protecting layer 9 in a uniform state rather than in a particle form and therefore such attaching state of scattered particles and vapors does not cause any noise and does not lower the resolving power. Furthermore, protecting layer 9 is not destroyed by a laser beam and can protect recording layer 4 after the recording as well, and therefore protecting layer 9 imparts excellent mechanical characteristics favoring storage and handling to the recording member.

Since the protecting layer is not destroyed by the laser beam, the protecting layer is kept substantially so flat that dusts, if any, attaching to the surface of the protecting layer can be easily removed without hurting the surface.

Desirable protecting layers are those having a high mechanical strength, particularly, a high surface strength, and capable of closely contacting with the recording layer. Further, a protecting layer is desirable which does not lower the sensitivity of the recording layer to a great extent when the protecting layer is mounted on the recording layer. The protecting layer should not be substantially destroyed by the laser beam applied to produce a record. This means that the protecting layer prevents the scattered particles and vapors of the recording layer from coming out of the recording member. It is desirable that the transmittancy of the protecting layer as to the laser beam used is high. High transmittancy of the protecting layer results in a low absorption of the laser beam applied to reduce the possibility of destroying the protecting layer to a great extent.

The laser beam is usually applied from the protecting layer side, but when the laser beam is applied from the support layer side, the transmittancy of the protecting layer may be somewhat lower than that when the laser beam is applied from the protecting layer side. In most cases the transmittancy of the protecting layer is preferably not lower than 70%, more preferably not lower than 80%. The protecting layer is heated somewhat by the laser beam irradiation. Most of the heating is attributed to a heat conduction from the recording layer. Therefore, when an unduly higher intensity of laser beam than that required for making the record by deformation of the recording layer is used, the protecting layer may be destroyed. The optimum intensity of the laser beam can be easily determined by experiments as to the recording layer material, the protecting layer material and the shapes thereof.

Even if the protecting layer is somewhat thermally deformed by heat conduction from the recording layer, the function of the protecting layer is not lost unless the protecting layer is destroyed in the whole thickness.

The protecting layer may be made of an organic material, or an inorganic material. As representative inorganic material, there may be mentioned a transparent dielectric material and a transparent electroconductive material. Examples of the inorganic materials are oxides such as ZnO, MgO, $Al_2O_3$, SiO, $SiO_2$, $ZrO_2$, $CeO_2$, $In_2O_3$, $SnO_2$ and $TiO_2$, fluorides such as $MgF_2$, $CaF_2$ and $CeF_3$, and chalcogen compounds such as ZnS, $GeS_2$, $Sb_2S_3$ and the like.

The inorganic protecting layer may be produced by a method similar to that for preparing the recording layer as shown below. It is preferable to employ a vacuum vapor deposition process using a resistance heating or electron beam heating and form the protecting layer in the same bell jar as used for forming the recording layer, following the formation of said recording layer. Thus, attaching of dusts to the surface of the recording layer surface can be prevented and in addition, the time and cost for producing the recording member also can be reduced.

As the organic materials for the protecting layer, there may be mentioned organic high polymers, preferred with those of solvent evaporation solidifying type and those of catalyst curing type.

Representative organic high polymers of solvent evaporation solidifying type are nitrocellulose resins, acetyl cellulose resins, polyvinyl chloride resins, polycarbonate resins, saturated polyester resins, polystyrene resins and acrylic resins.

Representative organic high polymers of catalyst curing type are unsaturated polyester resins, polyurethane resins, and epoxy resins.

Among them, linear saturated polyester resins and a combination of nitrocellulose and acrylic resin are preferable as to easy coating, fitness to a support made of a flexible material such as film and stability upon laser beam recording.

The organic high polymers may be formed into a protecting layer by one of the various conventional methods. Representative are a spray method, a dipping method, and a coating method using a blade or bar. As for a special type of resin such as fluorine containing resins, a vapor deposition at a low or medium vacuum is preferred because a uniform coating can be obtained.

The protecting layer may be produced by laminating an organic high polymer film on the surface of the recording layer and this is one of the desirable embodiments because there is easily available an organic high polymer film of a uniform thickness of less than several % of error and of uniform optical properties along the film surface direction.

When a protecting layer is laminated on a recording layer with an adhesive, it is necessary to select such an adhesive that is not forced out to attach an unnecessary portion of the recording member because the recording member is subjected to a pressure by, for example, a roller upon recording and reading-out. A hot-melt type of adhesive is preferable in the present invention. Representative preferable hot-melt adhesives are polyvinyl chloride, polyvinyl acetate, polyethylene, ethylene-vinyl acetate copolymer, polybutyral, polyacrylate, cellulose acetate, polyamide, wax and paraffin, rosin, asphalt, and epoxy resin. Among them, thermoplastic polyesters, polyvinylidene chloride, and polyacrylate are more preferable.

When a film to be used as a protecting layer is laminated on a recording layer surface, the adhesive may be applied to either side of the recording layer or of the protecting layer film, but it is preferable to apply the adhesive to the surface of the protecting layer film to avoid damaging the recording layer. There are various means for coating an adhesive on an organic high polymer film to be used as a protecting layer. For example, the film is heated and then an adhesive in a form of bar or powder is pressed onto the whole surface of the film, or a hot melt liquid of an adhesive is coated on the film, or in case of polyethylene or ethylene-vinyl acetate copolymers, the film is passed through a melt liquid of an adhesive to soak or coat on one side of the film.

Another simple and good method for coating is that a hot-melt agent is dissolved in a solvent and an optimum amount thereof is dropped to the surface of a film to be used as a protecting layer and squeezed with an edge of a metal plate to coat the liquid uniformly on the film surface and then the film thus coated is placed in a thermostat and dried until the solvent is evaporated off. Sometimes it is not always necessary to coat the adhesive on the whole surface of the film as shown in FIG. 5.

Figure 4:
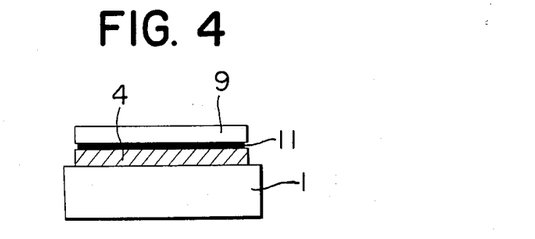
FIG. 4 and FIG. 5 are cross sections of further embodiments of the recording member according to the present invention.
Figure 5:
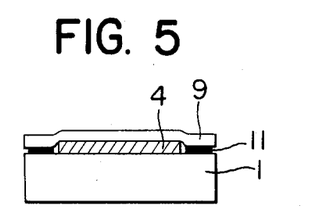

In general, the protecting layer 9 is adhered to the whole surface of the recording layer 4 with an adhesive layer 11 as shown in FIG. 4, but in FIG. 5 the protecting layer 9 is adhered to the margin of a support 1 or both ends thereof with an adhesive 11 and there is not any adhesive layer between protecting layer 9 and recording layer 4.

Thickness of the protecting layer is usually not more than 10 microns, preferably of 0.1 - 10 microns and more preferably of 0.3 - 3 microns.

The recording layer is composed of a non-metallic material and absorbs the laser beam efficiently. The laser beam thus absorbed is converted to heat energy in the recording layer and this generated heat causes the deformation of the recording layer by vaporization and/or melting. It is preferable to be a highly sensitive recording layer that the transmittancy of a light having a wavelength of laser beam through the recording layer is not higher than 30%, more preferred with not higher than 20%.

Representative non-metallic materials used for the recording layer are inorganic oxides, chalcogen compounds and resins. The resins may contain a dye or pigment.

Some of the oxides and chalcogen compounds contain elements at a stoichiometric ratio, but some do not contain elements at a stoichiometric ratio. Optical properties of the latter are fairly different from those of the former.

Recording layer materials of a relatively high sensitivity are lead oxide, tungsten oxide, titanium oxide, silicon oxide, zirconium oxide and the like.

In this invention, "light" includes ultraviolet rays and infrared rays. Therefore, when the wavelength of the laser in a region other than visible light region, for example, in the region of ultraviolet or infrared rays, the opacity of the recording layer is not that as to a visible light. As a material for forming a recording layer, a chalcogen compound is particularly good. A chalcogen compound is a compound containing a chalcogen element, that is, S, Se and Te. The composition can be continuously changed so an infinite number of chalcogen compounds can be present.

Representative chalcogen compounds contain one or more of As, Sb, P, Ge, Si, Tl, other metals, and halogen other than chalcogen elements. From practical handling point of view, as a chalcogen element, sulfur is preferable, and as an element to be combined with the chalcogen element, there are preferably mentioned Ge, In, Sn, Cu, Ag, Fe, Bi, Al, Si, Zn, and V. For producing a thin film of a chalcogen compound, it is preferable that the chalcogen compound contains one or more of Ge, In, Sn, Cu, and Ag.

Representative chalcogen compounds useful in the present invention are $GeS$, $GeS_2$, $Ge_2S_3$, $Sn_{12}Ge_{25}S_{63}$, $Sn_{16}Ge_{17}S_{67}$, $Sn_{25}Ge_7S_{68}$, $Sn_7Ge_{16}S_{77}$, $In_{14}Ge_{29}S_{57}$, $In_{20}Ge_{20}S_{60}$, $In_{30}Ge_{10}S_{60}$, $In_{10}Ge_{20}S_{70}$, $Ag_{25}Ge_{25}S_{50}$, $Ag_{23}Ge_{17}S_{50}$, $Ag_{10}Ge_{35}S_{55}$, $Ag_{20}Ge_{15}S_{65}$, $Ag_5Ge_{23}S_{72}$, $Cu_{14}Ge_{29}S_{57}$, $Cu_{33}Ge_{17}S_{50}$ and the like. Sulfur alone as a single substance is also a kind of preferable chalcogen compound.

The above mentioned oxides and chalcogen compounds may be used as a material for the protecting layer. As to oxides, there is scarcely such a case that one oxide containing particular elements at a particular composition ratio (ratio of elements contained) is used for both a recording layer material and a protecting layer material because an oxide having a particular composition ratio shows particular optical characteristics which are usually suitable for only one of a recording layer and a protecting layer.

Optical characteristic such as light transmittancy of an oxide is remarkably changed due to a slight difference of the composition ratio. Even if the kinds of elements contained are the same, the oxides having different composition ratio from each other shown quite different optical characteristics and for example, one is suitable for a protecting layer material while the other is suitable for a recording layer material.

Optical characteristics of the chalcogen compounds also change depending upon the composition ratio. Further, their spectral absorption property changes, to a great extent, depending upon the kinds of elements contained so that one chalcogen compound can be used as a recording layer or a protecting layer depending upon the wavelength of the laser beam used.

For example, most of chalcogen compounds have the absorption end at the visible light wavelength region or near there, and a light having a wavelength longer than the wavelength at the absorption end is hardly absorbed and therefore the transmittancy amounts to as high as not lower than 70% or not lower than 90%. On the contrary, a light having a wavelength shorter than that at the absorption end is strongly absorbed and the transmittancy is not higher than 30%.

As to chalcogen compounds, for example, ZnS, $GeS_2$ and $Sb_2S_3$ have their absorption ends at about 350, 450 and 750 millimicrons, respectively.

Further, as to oxides, the oxides in a stoichiometric bonding state such as $ZnO_2$, $CeO_2$, $InO_3$, $SnO_2$, $TiO_2$ and the like, are almost transparent to a visible light. When these oxides lack in a very small amount of oxygen, they are relatively stable and show a high light absorption property. For example, when a layer of oxide is produced in an oxidizing atmosphere or after forming a layer of oxide the layer is subjected to an oxidizing treatment, the resulting layer is highly transparent. When the layer is not prepared under such conditions, the resulting layer shows a high light absorption property.

It is preferable to form the recording layer as a thin film on the support because uniformity of the film is required. The thin film may be produced by one of various conventional methods such as vacuum vapor deposition and sputtering by using resistance heating, electron beam heating and ion beam heating. Optimum thickness of the recording layer varies depending upon properties of the material and uses of the resulting recording member. In general, the thickness is 0.01 – 10 microns, preferably less than 1 micron, more preferably 0.02 – 0.5 microns, from sensitivity and resolving power points of view.

The support is not critical in the present invention. The support may be transparent, semi-transparent or opaque depending upon which of a transmitting light or a reflecting light is used for reading out the recorded information. The material of the support is selected taking into consideration physical amounts such as heat capacity and rate of reflection which are limited by the intensity and other factors of the laser beam used. Representative support materials are transparent high polymer films such as polyesters, polyethylenes and acetyl cellulose, oxide glasses, and aluminum plates or foils.

Figure 6:
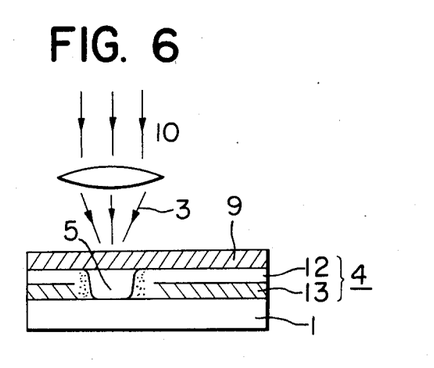
FIG. 6 is a cross section of a form of producing a record by applying a laser beam to a further embodiment of the recording member according to the present invention.

The recording layer may be composed of a laminate or a non-metallic layer 12 and a metal layer 13 as shown in a recording layer 4 in FIG. 6. The metal layer contributes to increase in contrast. The high reflection rate of the metal layer usually decreases the sensitivity, but the non-metallic layer 12 suppresses the reflection and therefore the decrease in sensitivity can be avoided. As shown in FIG. 6 metal layer 13 is arranged under non-metallic layer 12 and a laser beam 3 is applied from the non-metallic layer side. When the laser beam is applied to the recording medium from the support side, the arrangement of metal layer 13 and non-metallic layer 12 is just opposite to that in FIG. 6.

Thickness of the metal layer is preferably not more than one micron, and more preferably 0.02 – 0.2 microns.

Representative metals for constituting the metal layer are noble metals such as Pt, Rh, Au, Ag, Pd, and Ir, and other metals such as Cr, Mo, Ta, Zn, Cu, Al, In, Sn, Pb, and Bi.

The invention will be understood more readily by reference to the following examples. However, these examples are intended to illustrate the invention and are not to be construed to limit the scope of the invention.

EXAMPLE 1

A glass disk having a thickness of 2 cm and a diameter of 30 cm was used as a support and a chalcogenide glass $Ge_{50}S_{50}$ was vapor-deposited onto a surface of the glass disk in a thickness of 1400 – 2000 A. The vapor-deposition was carried out by resistance heating method using a tantalum boat under the vacuum degree of $5.3 \times 10^{-6}$ Torr at the boat temperature of about 700° C. The recording member thus prepared was subjected to recording for using it as a video disk in the following manner.

The above-mentioned glass disk was firmly fixed to one end of a shaft connected to a motor and rotated at a speed of about 3000 rpm. The laser light from an argon laser (4880 A in wavelength, 200 mW in output) was introduced into an electro-optical element, frequency-modulated by a video signal and condensed to the surface of the $Ge_{50}S_{50}$ film of the recording member by a microscope objective lens having a working distance of about 70 microns. The objective lens was set so as to move in the radius direction by about two microns per one revolution of the glass disk and record the signal in a spiral shape.

The recording of the video signal was effected in such system. The lens was contaminated by deposit which appeared to be germanium sulfide evaporated from the laser-irradiated portion of the recording member about 5 seconds after the starting of the irradiation, and therefore subsequent recording could not be effected.

On the other hand, a recording member was prepared in such a manner that a protecting layer was formed on the same deposited film $Ge_{50}S_{50}$ of the glass disk as mentioned above by coating a polyester resin solution which had been prepared by diluting a 30% methyl ethyl ketone solution of a linear saturated polyester resin (Vylon 200, a trade name for a product of Toyoboseki K.K.) with toluene in a ratio of 2 : 1. The coating was effected by a spinner so as to be 2 – 3 microns in thickness. The recording member thus prepared was subjected to the same recording as mentioned above. In this case, even after the recording was continuously effected for about 30 minutes, the contamination of the lens could be hardly observed.

After the completion of the recording, the surface of the above-mentioned recording member was observed by a microscope so that only the film $Ge_{50}S_{50}$ of the laser-irradiated portion was found to be removed. No distinguishable change was observed in the protecting layer. Splash of the recording layer-forming material from the other laser-irradiated portion could be hardly observed which caused to drop out upon reading out the signal.

In addition, the reading out of the signal was carried out in such a manner that the laser light having an output which was extremely low as compared with that for the above-mentioned recording was irradiated to the recording member along the recorded portion of a spiral shape and the difference in the intensity of the reflected light between the recorded portion and non-recorded portion was detected. As the result, a good color television image could be obtained.

EXAMPLE 2

A transparent polyester film having a thickness of 75 microns was used as a support, and a chalcogenide glass $Ge_{50}S_{50}$ was vapor-deposited to one side of the polyester film in a thickness of 2500 Å in the same manner as in Example 1 to prepare a recording member. A microimage was recorded on the recording member by means of an argon laser (wavelength of 4880 Å) in a reduction ratio of 1/9. The recording was effected in such a manner that the recording member was stuck on a drum having a diameter of about 2 cm with an adhesive tape in order that the support side of the recording member might be brought into contact with the drum surface. The drum was rotated to effect the scanning in one direction. The scanning in the direction rectangular to the former direction was effected by moving the microscope objective lens for condensing the laser light in the direction parallel to the axis direction of the drum. The modulation of the light intensity was carried out by an electro-optical element, and the concentration of each point of the original image which was converted into a FM signal was introduced to the electro-optical element to effect the recording.

The recording condition was that the laser beam in the recording member surface was about three microns in diameter, the scanning speed about 2.5 m/sec., the recording time about one minute and the laser light output required for obtaining the most suitable image having a resolution of more than 500 lines/mm was about 200 mW.

The image recorded in the above-mentioned manner was observed by a microfilm viewer of transmission type so that it was found that fine particles seemingly splashed from the other laser light-irradiated portion deposited to the portion (laser light-irradiated portion) which was recognized to be light upon observing by the viewer and therefore the image quality was not sufficient. In addition, such tendency was recognized also in case that the recording member was stuck on the drum in order that the recording layer might be brought into contact with the drum surface.

On the other hand, a recording member was prepared by forming a protecting layer on the above-mentioned $Ge_{50}S_{50}$ deposited film. The protecting layer was formed in such a manner that a composition (Aron S1005, a trade name for a product of Toa Gosei Kagaku Kogyo K.K.) composed of nitro cellulose, acrylic resin and a small amount of a plasticizer was dissolved in methyl ethyl ketone in a ratio of 1 : 1 and the resulting solution was diluted with toluene in a ratio of 2 : 1 and then the dilution was coated in a thickness of three microns by the bar coating method. An image was recorded on the recording member having the protecting layer in the above-mentioned recording manner, and as the result, an image having no deposit splashed from the laser-irradiated portion was obtained in substantially the same laser light output as mentioned above. The protecting layer was not destroyed at all.

When the laser light output was increased to 400 mW to effect the recording, it was clearly observed that the protecting layer of the laser light-irradiated portion was also thermally deformed.

The laser light output was further changed to 270 and 300 mW to carry out the recording. The obtained images were observed by a microfilm viewer of transmission type so that it was recognized that the image obtained in the laser light output of 270 mW was deep green in the laser-irradiated portion while that obtained by the laser light output of 300 mW was almost black in the portion, and both images were negative corresponding to the non-irradiated portion which was reddish brown near to gold.

EXAMPLE 3

A recording member was prepared in such a manner that $CaF_2$ was continuously vapor-deposited to the $Ge_{50}S_{50}$ deposited film of the recording member prepared in Example 1 as a protecting layer in the same vacuum bell jar. Such continuous vapor-deposition reduced deposition of dust to the recording layer surface to a great extent and the time required for the preparation was also reduced by half or less as compared with the case in which the recording layer and protecting layer were separately formed by vapor-deposition. The $CaF_2$ deposited film was about 1.2 micron in thickness, the single crystal of $CaF_2$ was used as the deposition source.

A microimage was recorded on the recording member having the above-mentioned protecting layer by the recording method adopted in Example 2 under the same condition as that of Example 2 so that a good image was obtained. The destruction of the protecting layer was not recognized within 400 mW of the maximum output of the used laser.

EXAMPLE 4

Tungsten oxide was vapor-deposited to a polyester film support having a thickness of 75 microns as a recording layer-forming material by the electron beam heating method. The condition of the deposition is as follows:

| Material | $WO_3$ (specific gravity 7.16 g/cm) |
|---|---|
| Support temperature | Room temperature |
| Distance* | 35 cm |
| Vacuum degree | |
| (initial) | $0.9 \times 10^{-6}$ Torr |
| (during deposition) | $1 - 5 \times 10^{-5}$ Torr |
| Electron beam | |
| Accelerating voltage | 9 KV |
| Beam current | 100 mA or less |
| Scanning frequency | 9 times/sec.** |
| Scanning area | about 1 cm × 1 cm |
| Deposition rate | 100 - 1000 Å/sec. |
| Deposition time | 2.9 minutes |
| Vaporization amount | 7 g |
| Thickness | 3000 Å |

*Between vaporization source support.
** As to each of longwise and crosswise directions.

The deposited film prepared under the above-mentioned condition was black since it was lacking in a very small amount of oxygen, and therefore it was good as the recording layer.

A linear saturated polyester resin used in Example 1 which was a protecting layer-forming material was coated to a part of the above-mentioned deposited film so as to be 3 microns in thickness by a coating bar. A microimage was recorded on the recording member by the recording method adopted in Example 2 in the laser light output of 300 mW. When the portion having the protecting layer and that having no protecting layer were compared with each other by means of a microfilm viewer, it was found that the granulated deposit was formed in the portion having no protecting layer, particularly in the portion which was recognized to be light through the microfilm viewer while in the portion having the protecting layer, the formation of such deposit was prevented due to the protecting layer.

EXAMPLE 5

Recording members were prepared in the same procedure as that of Example 2 except that $Ge_2S_3$ and $GeS_2$ were separately used as the recording layer-forming material in place of $Ge_{50}S_{50}$. A negative image was formed on the recording members under the same condition as in Example 2. The optical density of the recorded portion was lower than that of the recording member having $Ge_{50}S_{50}$ layer, and an image having a further improved contrast which was easy to see could be formed.

EXAMPLE 6

A recording member was prepared by vapor-depositing zinc sulfide as the protecting layer onto the $Ge_{50}S_{50}$ deposited film prepared in Example 1 by the resistance heating method under the following condition.

| Material | ZnS as hot-pressed |
|---|---|
| Support temperature | Room temperature |
| Distance | 30 cm |
| Vacuum degree during deposition | $1.5 \times 10^{-5}$ Torr |
| Boat material | Tantalum |
| Boat temperature | 1200° C |
| Film thickness | 1.0 μ |

The ZnS film formed by the above method was substantially transparent in visible region.

A microimage was recorded on the recording member having the protecting layer of ZnS by the recording method adopted in Example 2 under the same condition as in the example so that a good image was obtained. Any destruction of the protecting layer was not observed at all within 400 mW of the maximum output of the employed laser.

EXAMPLE 7

A recording member was prepared by replacing the protecting layer of Example 6 by an $SiO_2$ layer which was formed by the electron beam vapor-deposition under the following condition.

| Material | Quartz glass |
|---|---|
| Support temperature | Room temperature |
| Distance* | 35 cm |
| Vacuum degree (initial) | $1.4 \times 10^{-6}$ Torr |
| (during deposition) | $1.0 \times 10^{-5}$ Torr |
| Electron beam | |
| Accelerating voltage | 9 KV |
| Beam current | 50 mA |
| Scanning frequency | 9 times/sec.** |
| Scanning area | 1 cm² |
| Deposition time | 3 minutes |
| Film thickness | 0.5 μ |

*Between vaporization source and support.
** As to each of longwise and crosswise directions.

A microimage was recorded on the recording member having the above protecting layer by the recording method adopted in Example 2 under the same condition as in the example to obtain a good image. In addition, any destruction of the protecting layer was not observed at all within 400 mW of the maximum output of the employed laser.

EXAMPLE 8

A transparent polyester film having a thickness of 25 microns from which pollutant, dust etc. had been removed was used as a protecting layer-forming film, and a 20% methyl ethyl ketone solution of vinylidene chloride acrylic acid ester which had been sufficiently filtered to remove the finely divided solid was coated to the polyester film in a thickness ranging from several to less than twenty microns.

A transparent polyester film having a thickness of 100 microns was used as a support, to which SnS was vapor-deposited in a thickness of 3000 A to form a recording layer. The condition of the deposition is as follows:

| Material | SnS |
|---|---|
| Form of material | Powder |
| Vaporization amount | 200 mg |
| Boat material | Tantalum (10 mm in width) |
| Boat temperature | about 900° C |
| Boat current | 20 A |
| Support material | Polyester (100 μ in thickness) |
| Support temperature | Room temperature |
| Distance* | about 19 cm |
| Vacuum degree** | $1 \times 10^{-5}$ Torr |
| Deposition time | 150 seconds |
| Layer thickness | about 3000 A |

* Between vaporization source and support.
**During deposition.

The recording layer and the adhesive surface of the protecting film were brought into contact with each other and caused to pass through a heat roller to obtain a recording member film having the protecting layer film. The relation between the thickness of the adhesive and the temperature of the heat roller is given below.

| Heat roller surface temperature (°C) | Adhesive thickness (μ) 3 | 5 | 8 | 12 | 20 |
|---|---|---|---|---|---|
| 90 | Unevenness* Poor adhesion** | Unevenness Poor adhesion | Unevenness Poor adhesion | Unevenness | Unevenness |
| 100 | Fair | Good | Good | Good | Air bubble occurred |
| 110 | " Air bubble | " Air bubble | " Air bubble | " Air bubble | " |

| | | | | | |
|---|---|---|---|---|---|
| Adhesive thickness (μ) | | | | | |
| Heat roller surface temperature (° C) | 3 | 5 | 8 | 12 | 20 |
| 130 | occurred | occurred | occurred | occurred | |

*The surface of the protecting layer.
**Between the protecting layer and recording layer.

From the table, it was found that the suitable thickness of the adhesive used in the example was 5 - 12 microns and the suitable surface temperature of the heat roller was 100°- 110° C.

In order to test the effect of the protecting layer on the sensitivity and resolution of the recording member, the protecting layer was laminated on a part of the recording layer surface through the adhesive under the suitable condition of the above table to prepare a sample. Relative comparison was made with respect to the sensitivity and resolution (line width) due to the presence of the protecting layer.

The measurement of the sensitivity was carried out in the following manner.

Figure 7:
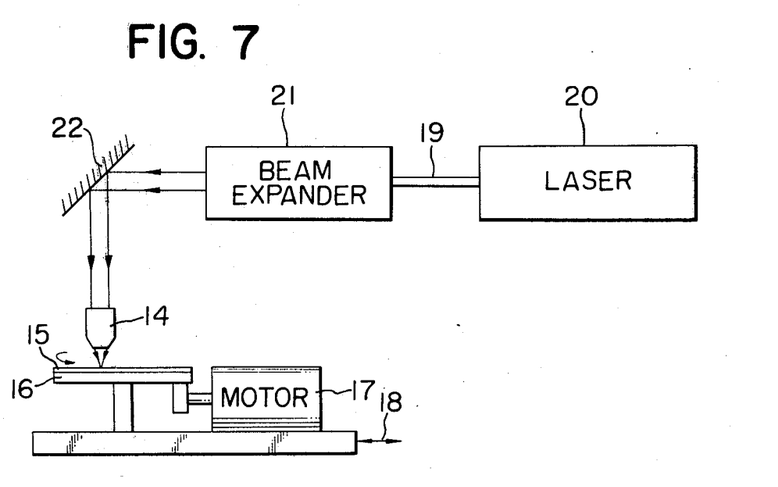
FIG. 7 is a schematic diagram of a device for recording by using a laser beam.

As shown in FIG. 7, a recording member 15 was placed on a turn table 16, which was rotated by means of a motor 17, and the turn table was simultaneously moved in a straight-lined direction (shown by the numeral 18) within the table surface. A laser beam 19 was condensed on the surface of the recording layer so as to be about three microns in the spot size to carry out the recording of spiral shape. The sensitivity was calculated from the limit point at which the linear velocity at the circumference of the turn table increased until it became impossible to carry out the recording.

The optical system for condensing the laser beam is composed of an Ar laser having an output of 20 mW, a beam expander 21, a mirror 22, and a microscope objective lens 14. The light loss due to the optical system was 70% in the visible light and 75% in the infrared ray. The resolution was estimated from the line width as recorded. As the result, change of the sensitivity and line width was not recognized regardless of the presence of the protecting layer.

In order to test the surface strength of the recording member having the protecting layer and the adhesion property (peeling off) of the protecting layer, a part of the sample for sensitivity evaluation was cut off into a tape having a width of 16 mm and a length of 30 cm, and both ends of the tape were connected to each other through an adhesive tape to prepare an endless tape.

The endless tape extended between two rubber rollers having a diameter of 10 mm in order that the protecting layer and recording layer surfaces might be brought into contact with the roller surfaces. These rollers were rotated at a speed of 100 rpm by means of a motor. As the result, the SnS surface on which no protecting layer was present was remarkably damaged after 100 revolutions. On the other hand, as for the portion having the protecting layer, peeling of the protecting layer film and occurrence of remarkable damage were not observed at all even after it was rotated more than 500 times, which shows the usefulness of the present invention.

EXAMPLE 9

A hot melt adhesive composed of an ethylene-vinyl acetate copolymer was melt and the heated solution was quickly coated to a polyester film to be used as a protecting film by using a wire bar. The ethylene-vinyl acetate copolymer adhered to the polyester film by being cooled upto a room temperature and formed a transparent film, and as the result, a protecting layer film for laminate was obtained.

The obtained protecting layer film was brought into contact with the same recording layer as in Example 8 and caused to pass through a heat roller in the samer manner as that in Example 8 to prepare a recording member having the protecting layer film.

The recording member was evaluated in the same procedure as in Example 8 to obtain a good result.

EXAMPLE 10

A recording member was prepared in the same manner as that in Example 8 except that a thermoplastic polyurethane elastomer was used in place of vinylidene chloride acrylic acid ester.

The recording member was tested in the same procedure as in Example 8 to obtain a good result.

EXAMPLE 11

A recording member as shown in FIG. 6 having a recording layer composed of a non-metallic and a metal layers was prepared by vapor-deposition. The condition of the deposition is as follows:

| | Metal layer | Non-metallic layer |
|---|---|---|
| Material | Bi | $Ge_{50}S_{50}$ |
| Form of material | Powder | Block |
| vaporization amount | 50 mg | 50 mg |
| Boat material | W (10 mm in thickness) | Ta |
| Boat temperature | about 900° C | about 700° C |
| Boat current | 20A | 75A |
| Support material | Polyester (25 mm in thickness) | Bi-deposited polyester film |
| Support temperature | Room temperature | Room temperature |
| Distance* | about 19 cm | about 26 cm |
| Vacuum degree** | 1 × 10⁻⁵ Torr | 5.3 × 10⁻⁶ Torr |
| Deposition time | 35 seconds | |
| Layer thickness*** | about 500 A | 500A |

*Between vaporization source and support.
**During deposition.
***Obtained in such a manner that the thickness of the layer was controlled by a film thickness controller and measured by a monitor sample.

A transparent polyester film having a thickness of 25 microns was stuck on the recording member as the protecting layer-forming film by means of the adhesive used in Example 8 to prepare a laminate. The surface strength and sensitivity of the laminate were tested in the same manner as that in Example 8. It was found that the surface strength was about 20 times as high as that of the laminate having no protecting layer, and remarkable change of the sensitivity and resolution was not observed at all.

In this example, the recording member may be prepared in such a manner that the thin protecting layer is used as a substrate for deposition, on which the recording layer is formed by vapor-deposition and then the thick support is stuck on the recording layer by using an adhesive.

EXAMPLE 12

A recording member was prepared by using the materials under the condition as shown below.

|  | Metal layer | Non-metallic layer |
|---|---|---|
| Material | Sn (99.999% in purity) | $Bi_{50}S_{50}$ |
| Method | Resistance heating vapor-deposition | |
| Boat material | Tungsten | Tantalum |
| Boat temperature | 820° C | 700° C |
| Support temperature | Room temperature (about 25° C) | |
| Vacuum degree* | $5 - 6 \times 10^{-6}$ Torr | |
| Distance** | 26 cm | |
| Layer thickness | 700 A | 1000 A |
| Support | Glass disk (23 cm in diameter, 2 cm in thickness) | |

*During deposition
** Between boat and support.

The recording member thus prepared was subjected to the recording of video signal in the following manner.

The recording member was firmly fixed to a rotary disk and rotated at a speed of 1800 rpm. An argon laser (0.488 micron in wavelength, 200 mW in output) was used as the light source and, it was introduced into an electro-optical element and frequency-modulated by the video signal. The laser beam was condensed by using a microscope objective lens having a working distance of about 70 microns. The carrier for the objective lens was set so as to move in the radius direction by about two microns per one revolution of the disk.

According to the above-mentioned recording system, the video signal was recorded on the recording member in the spiral shape of unevenness. In addition, the deposit generating from the recording layer adhered to the surface of the objective lens about 5 seconds after starting of laser beam irradiation. Due to this, the accuracy of the subsequent recording reduced.

On the other hand, a protecting layer was formed on the non-metallic layer of the above-mentioned recording member to prepare a recording member. As the protecting layer-forming material, a polyester resin solution was used which had been prepared by diluting a linear saturated polyester resin (Vylon 200, a trade name for a product of Toyoboseki K.K.) with methyl ethyl ketone to form a 30% solution and further diluting the resulting solution with toluene in a ratio of 2 : 1. The protecting layer was formed in a thickness of 2 - 3 microns by the usual spinner method.

The recording member having the protecting layer was subjected to the recording of the video signal in the same manner as mentioned above. At this time, no contamination of the lens surface was observed, and the video signal was recorded on the recording layer without any change of the protecting layer. In addition, even when the surface of the recording member was carefully observed, any deposition of granulated material generating from other portion to the recorded portion was not observed at all, which might cause to drop out.

EXAMPLE 13

A recording member as shown in FIG. 6 was prepared in such a manner that the vapor-deposited film of Au (0.1 micron in thickness) was used as the metal layer, the electron beam deposited film of Si (0.014 micron in thickness) as the non-metal layer, a polyester film (75 microns in thickness) as the support and a nitro cellulose type resin as the protecting layer-forming material.

A microimage was recorded on the recording member to obtain a good image.

EXAMPLE 14

A recording member was prepared in the same manner as that of Example 13 except that TiO (0.06 micron in thickness) was substituted for Si of the non-metallic layer. The TiO layer was formed by resistance heating vapor depositing method using a tungsten boat.

A microimage was recorded on the recording member to obtain a good image.

We claim:

1. A recording member for recording by applying a laser beam to remove a part of a recording layer by melting and/or vaporization whch comprises a support, a recording layer overlying the support, and a protecting layer overlying the recording layer, said recording layer being composed of a laminate including a sulphur compound layer and a metal layer and being about 0.01 - 1 micron in thickness, the metal layer underlying the sulphur compound layer in the direction of application of the laser beam, and said protecting layer being not substantially destroyed by the application of the laser beam for recording.

2. A recording member according to claim 1 in which the metal layer is about 0.02 to about 0.2 micron in thickness.

3. A recording member according to claim 1 in which the sulphur compound layer is composed of a chalcogen compound consisting of sulfur and at least one member selected from Ge, In, Sn, Cu and Ag, and the protecting layer is composed of a resin.

4. A process for recording which comprises, applying a laser beam bearing an information to be recorded to remove a part of a recording layer which comprises a support, a recording layer composed of a laminate including a sulphur compound layer and a metal layer and being about 0.01 to 1 micron in thickness and overlying the support, the metal layer underlying the sulphur layer in the direction of application of the laser beam, and a protecting layer overlying the recording layer, under conditions whereby only the recording layer is deformed and the protecting layer remains substantially intact.

* * * * *

UNITED STATES PATENT AND TRADEMARK OFFICE
CERTIFICATE OF CORRECTION

PATENT NO. : 4,069,487
DATED : January 17, 1978
INVENTOR(S) : MASANAO KASAI, ET AL.

It is certified that error appears in the above-identified patent and that said Letters Patent are hereby corrected as shown below:

Column 3, line 32, change "about 10" to --about 1.0--.

Column 8, line 22, change "1400 - 2000 A" to --1400 - 2000 Å--;

line 32, change "4880 A" to --4880 Å--.

Column 9, line 17, change "2500 A" to --2500 Å--;

line 20, change "4880 A" to --4880 Å--.

Column 10, in the table in Example 4, second column, 14th line, change "100 - 1000 A/sec." to --100 - 1000 Å/sec.--;

in Example 4, second column, 17th line, change "3000 A" to --3000 Å--.

Column 12, line 35, change "3000 A" to --3000 Å--;

in Example 8, 2nd column of table, change "about 3000 A" to --about 3000 Å--.

Column 14, in table in Example 11, second column, change "about 500 A" to --about 500 Å--;

in table in Example 11, third column, change "500A" to --500Å--.

UNITED STATES PATENT AND TRADEMARK OFFICE
CERTIFICATE OF CORRECTION

PATENT NO. : 4,069,487
DATED : January 17, 1978
INVENTOR(S) : MASANAO KASAI, ET AL.

It is certified that error appears in the above-identified patent and that said Letters Patent are hereby corrected as shown below:

Column 15, in table in Example 12, second column, change "700 A" to --700 $\overset{\circ}{A}$--;

in table in Example 12, third column, change "1000 A" to --1000 $\overset{\circ}{A}$--.

Signed and Sealed this

Fifth Day of June 1979

[SEAL]

Attest:

RUTH C. MASON
Attesting Officer

DONALD W. BANNER
Commissioner of Patents and Trademarks